Jan. 28, 1947.  W. C. STARKEY  2,415,050
THREE-WAY CLUTCH
Filed March 31, 1945
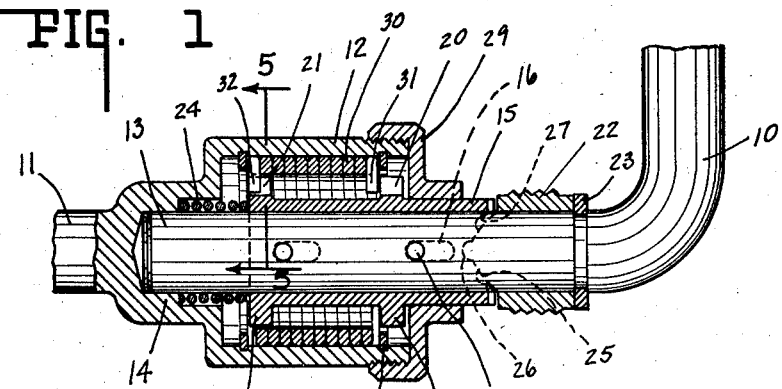
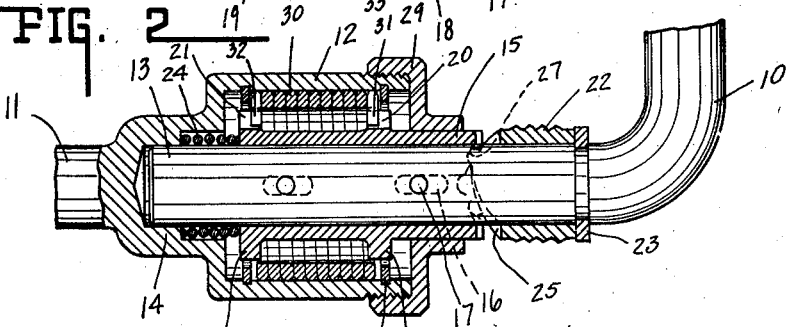
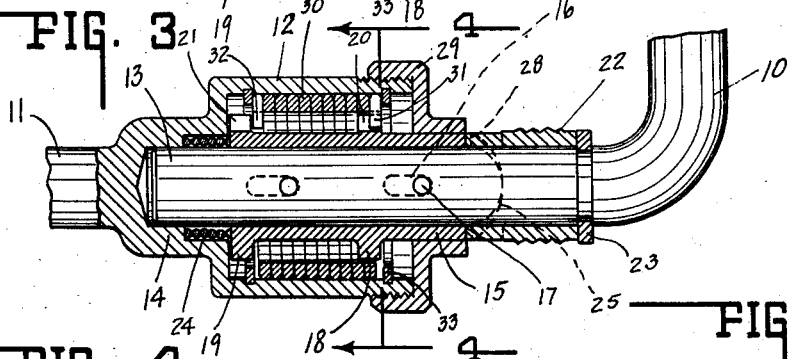
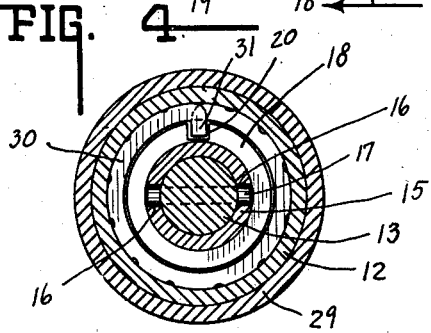
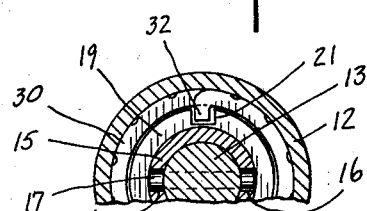
INVENTOR.
WILLIAM CARLETON STARKEY.
BY Lockwood, Goldsmith & Galt
ATTORNEYS.

Patented Jan. 28, 1947

2,415,050

UNITED STATES PATENT OFFICE 2,415,050

THREE-WAY CLUTCH

William Carleton Starkey, Indianapolis, Ind., assignor to Fletcher Trust Company, Indianapolis, Ind., a corporation, trustee Application March 31, 1945, Serial No. 585,920

14 Claims. (Cl. 192—43)

This invention relates to a three-way clutch having particular application for use as an indexing device in such tools as a brace and bit, screw driver or other tool equipment, wherein the operator desires a combination of ratcheting movement in either direction and positive drive in both directions through the medium of a simple adjustment.

It is the purpose of this invention to provide a three-position indexing device having an adjustable energizing sleeve with a shifter member movable to different positions such as to control a spring clutch. Upon setting the member to an intermediate position the sleeve will be adjusted to maintain the spring in clutching position when driving in either direction. In one extreme position of said member, the sleeve will be adjusted to so control the spring clutch that it will provide a driving connection in one direction, but will release when the driving action is in the opposite direction. Upon setting the member in the opposite position, the sleeve will be adjusted to reverse the action of the clutch in respect to the above.

The advantage of the invention lies in substituting a positive clutching action for the usual ratchet type of indexing device, and additionally providing through simple adjustment a three way clutch or indexing device having many advantages as will hereinafter be more fully set forth and described.

The full nature of the invention will be understood from the accompanying drawing and the following description and claims:

Fig. 1 is a central vertical section through the clutch showing it set for driving action when rotated clockwise, and releasing action when rotated counterclockwise.

Fig. 2 is the same as Fig. 1 showing the clutch set for positive driving action in either direction.

Fig. 3 is the same as Fig. 1 showing the clutch set for driving action when rotated counterclockwise and releasing action when rotated clockwise.

Fig. 4 is a section taken on the line 4—4 of Fig. 3.

Fig. 5 is a section taken on the line 5—5 of Fig. 1 with parts broken away.

The drawing is illustrative of one form of a three-way clutch or indexing device, as applied to a tool employed as a brace and bit. However, the clutch is applicable to any other tool or drive mechanism in the manner hereinafter described. Thus, as one example, there is shown a portion of a brace and bit wherein there is a driving member 10 which may be a part of the crank-like portion of a carpenter's brace. The driving member 10 is interconnected through the three-way clutch to drive a driven member 11, which may be the usual holding socket for insertion of a bit, screw driver or the like. The driven member 11 is formed with an integral pocket 12 having an inner clutch surface into which a bearing shank 13 extends having its bearing in the reduced bearing portion 14 of the member 11 formed in said pocket. The shank 13 is a continuation and part of the driving member 10, being rotatably mounted within the bearing portion 14 of the driven member 11.

Surrounding the shank 13 of the driving member there is an adjustable energizing sleeve 15 which is slidably pinned to the shank 13 to be longitudinally slidable thereon and rotatable therewith. This is accomplished by providing a pair of elongated slots 16 in alignment with each other adjacent each end of the sleeve 15 to slidably receive the driving pins 17 extending radially from the shank 13. The pin and slot arrangement is such that the pins will freely slide in the slots, but will rotatably drive the sleeve with a minimum of play. Said pins are arranged to extend through the wall of the sleeve, but not beyond, as shown in Fig. 4.

The sleeve 15 is provided with spaced flanges 18 and 19, which are substantially twice the thickness or width of the spring coils as hereinafter described. Said flanges are each provided with a slot or pocket 20 and 21, respectively, extending in alignment with each other.

The longitudinal position of the energizing sleeve may be adjusted relative to the pocket 12 of the driven member by a knurled shifter member 22 in the form of a collar freely rotatable upon the shank 13 adjacent the operating portion of the driving member 10. Its longitudinal movement is restricted in one direction by a retaining ring 23. In the other direction it abuts the sleeve 15 which in turn bears against the compression spring 24. The spring 24 is mounted within the bearing portion 14 of the pocket, engaging therewith at one end and at the other end engaging said sleeve. Said spring is always under tension tending to yieldingly force said sleeve against the shifter member 22. The adjacent ends of the shifter member and sleeve are provided with cam surfaces indicated at 25, so that upon rotation of the shifter member said surfaces will be caused to slide relative to each other to position the sleeve 15 longitudinally of the shank 13 against the tension of spring 24.

For positioning the shifter member and sleeve, the former is provided with opposed projections 26 at the extreme forward position of its cam surface. Said projections are formed to seat and releasably interlock with corresponding recesses provided in the cam surface of the sleeve, as illustrated by dotted lines in Fig. 1. Upon partial rotation of the shifter member, its projections 26 may be moved to seat in the recesses 27 formed on the cam surface of the sleeve, as indicated in Fig. 2. Further partial rotation of said member will move its projections into seating engagement with the recesses 28, as shown in Fig. 3.

From the foregoing it will be observed that in the relative positions of the shifter member and sleeve as shown in Fig. 1, the sleeve will be maintained at its outermost position by the tension of spring 24. As shown in Fig. 2, it will be at its intermediate position, and in Fig. 3 it is shown in its innermost position. The shank 13 supporting said sleeve, has its outer bearing in and is supported by the retaining collar 29, which has screw threaded engagement with the pocket 12.

Mounted within the pocket 12 for normal clutching engagement with the inner surface thereof, there is provided a clutch spring 39 having aligned projections in the form of inwardly bent toes 31, 32 at opposite ends thereof. Said clutch spring is retained against longitudinal movement within the pocket by the retaining rings 33. It is of the usual character, slightly ever expanded with respect to the clutch surface of the pocket so as to normally be in frictional clutching engagement therewith. The inturned toes are so aligned that the sleeve 15 may freely slide relative thereto with said toes arranged to extend into one or the other or both slots 20, 21.

By reason of the toes and recesses being in alignment, the sleeve may be readily assembled relative to the spring, whereby the slot 21 thereof will slide past the toe 31 in position to be engaged by the toe 32, and whereby the sleeve may be moved to position for both toes of the clutch spring to simultaneously engage in both recesses and permit sliding movement of the sleeve relative to said toes throughout its varying longitudinal positions. It will be noted that the flanges 18, 19 and, therefore, their slots 20, 21 are twice the thickness of the toes. Thus, in the outermost position of the sleeve, as shown in Fig. 1, half of the slot 21 will receive the toe 32, whereas the toe 31 will be free of the slot 20. In Fig. 2 the sleeve has been shifted to its intermediate position wherein both toes are engaged within their respective slots. In Fig. 3 the sleeve has been shifted to its innermost position wherein the toe 31 is engaged within the slot 20, but the toe 32 is free of engagement with its corresponding slot.

With the sleeve in the position of Fig. 1, see also Fig. 5, upon rotating the driving member 10 clockwise, the shoulder defining the slot 21 will butt against the toe 32 tending to expand the spring and maintain it in clutching engagement for driving the driven member 11. It will be noted that in this position there is no contacting relation between the opposite toe 31 and the shoulder of its associated slot 20. However, upon reverse movement of the driving member the shoulder of slot 21 will engage the toe 32, moving it counterclockwise to wrap down the clutch spring out of clutching engagement so as to provide an over running action with respect to the driven member.

In the intermediate position of the energizing sleeve shown in Fig. 2, both slots are engaged by both toes of the spring. As will be observed in Figs. 4 and 5, the toes at the respective ends lie closer to that shoulder of the respective slots which tends to expand them into clutching engagement, while on the other side of the toe there is some free play. Therefore, in the position of Fig. 2, movement of the driving member in either direction will cause the sleeve to butt up against one or the other toe, depending upon the direction of drive, tending to expand the spring and maintain it in clutching engagement. Thus, the driven member will be positively driven in either direction.

In the position shown in Fig. 3, the toe 31 lies in the slot 20 whereas the toe 32 is free of the slot 21. Thus, when the driving member is moved counterclockwise, the toe will be engaged to wrap down the spring out of clutching engagement, breaking the driving connection with the driven member 11. When the movement of the driving member is reversed, the shoulder of the slot 20 will butt against the toe in a direction to expand the spring into clutching engagement to effect the driving connection with the driven member.

The foregoing advantages of this device will be apparent, but it may be noted that it is noiseless as compared with the usual ratchet type of indexing device, and where applied to a tool is particularly useful in confined quarters where the radial movement may be limited. Thus, whereas a ratchet type indexing device requires a substantial and predetermined radial movement to take a new hold, depending upon the length of the ratchet teeth, the immediate gripping of this clutch spring at any radial point will cause it to take a fresh hold irrespective of any distance of movement. Also, there are less working parts and there should be corresponding longer life of such a device.

The invention claimed is:

1. An indexing device including a driving member, a driven member, one of said members being provided with a clutch surface, a clutch spring mounted for clutching engagement with said surface and provided with a projection on each end portion thereof, an energizing element slidably mounted for rotation with the other of said members having means for embracing said projections, and a shifter operable to move said energizing element to selective positions relative to said spring to engage and actuate one or the other end portion thereof for selectively indexing the driven member in either direction, or engage said spring tending to move it to clutching engagement for driving said member in either direction.

2. An indexing device including a driving member, a driven member, one of said members having a clutch surface, a clutch spring mounted for clutching engagement with said surface and provided with a projection on each end portion thereof, and an energizing element slidable on said other member to different positions with respect to said spring, said energizing element being selectively engageable with one or the other end portion projections of said spring for indexing the driven member in one or the other direction, and positioned for operative engagement with both end portions of said spring for moving it to clutching engagement with said surface to drive the driven member in either direction.

3. An indexing device including a driving member, a driven member, one of said members being provided with a clutch surface, a clutch spring mounted for clutching engagement with said clutch surface and provided with a projection on each end portion thereof, and an energizing element slidably mounted for rotation with the other of said members for selective positioning to operatively engage one or the other or both end portion projections of said spring, whereby said driven member may be indexed in one or the other direction or positively driven in either direction according to the selective positioning of said energizing element.

4. An indexing device including a driving member, a driven member, a clutch surface on one of said members, a clutch spring mounted for clutching engagement with said surface and provided with an inwardly extending and aligned projection on each end portion thereof, and an energizing element slidably mounted on and rotatably connected with the other of said members provided with means for embracing said projections, said element being selectively positioned for embracing one of said projections to index the driven member in one direction, the other of said projections to index said member in the opposite direction and both projections for positively driving said member in either direction.

5. An indexing device including a driving member, a driven member, one of said members being provided with an internal clutch surface, a clutch spring having normal clutching engagement with said surface adapted to be wrapped down out of said clutching engagement, inwardly extending projections on each end portion of said spring, and an energizing element slidably mounted on and rotatably connected with the other of said members having means for selectively embracing said projections, said element being adapted when in one position to embrace one of said projections for wrapping the spring down out of clutching engagement when rotated in one direction and tend to expand said spring to clutching engagement when rotated in the opposite direction and when in another position to engage one or the other of said projections for expanding said spring to effect driving engagement between said members when rotated in either direction.

6. An indexing device including a driving member, a driven member, a pocket having an internal clutch surface connected with one of said members concentric with both members, a clutch spring having normal clutching engagement with said pocket adapted to be wrapped down out of clutching engagement, inwardly extending projections on each end portion of said spring, an energizing element rotatable with the other of said members and slidable thereon to selective positions within said spring and pocket and concentric therewith, and means on said element engageable with said projections according to its selected position, said means being so related to said projections as to engage one projection only to index the driven member in one direction and the other projection only to index said member in the opposite direction, and engageable with both of said projections when in a third position to expand said spring for clutching engagement to positively drive said member in either direction.

7. An indexing device including concentric driving and driven members, a pocket having an internal clutch surface mounted on the driven member for receiving and rotatably supporting therein the driving member in concentric relation thereto, a clutch spring mounted in said pocket having normal clutching engagement with the internal clutch surface thereof adapted to be wrapped down out of said clutching engagement, inwardly extending toes formed on each end portion of said spring, an energizing sleeve slidable longitudinally of and rotatable with said driving member within said spring for selective positioning relative thereto, and shoulder elements mounted on said sleeve movable therewith and so related to the inwardly extending toes of said spring as to embrace both of said toes when in one position and one or the other of said toes when in other selective positions, whereby in said first-mentioned position the driven member may be driven through said element and spring in either direction and when in the last-mentioned positions said spring will be expanded or wrapped down to index the driven member in either direction.

8. An indexing device including concentric driving and driven members, a pocket having an internal clutch surface mounted on the driven member for receiving and rotatably supporting therein the driving member in concentric relation thereto, a clutch spring mounted in said pocket having normal clutching engagement with the internal clutching surface thereof adapted to be wrapped down out of said clutching engagement, inwardly extending toes formed on each end portion of said spring, an energizing sleeve slidable longitudinally and rotatable with said driving member within said spring for selective positioning relative thereto, and spaced flanges provided on said energizing element having pockets for receiving the toes of said spring, said pockets being of a width relative to said toes to embrace both toes when said element is in intermediate position and only one of said toes when in either extreme position, whereby said driving member will impart rotation to said driven member through said spring in either direction when both toes are embraced by said pockets and will index said driven member through said spring in either direction according to the embraced toe of said spring when said energizing element is in one or the other extreme position.

9. An indexing device including concentric driving and driven members, a pocket having an internal clutch surface mounted on the driven member for receiving and rotatably supporting therein the driving member in concentric relation thereto, a clutch spring mounted in said pocket having normal clutching engagement with the internal clutching surface thereof adapted to be wrapped down out of said clutching engagement, inwardly extending toes formed on each end portion of said spring, an energizing sleeve slidable longitudinally and rotatable with said driving member within said spring for selective positioning relative thereto, spaced flanges provided on said energizing element having pockets for receiving the toes of said spring, said pockets being of a width relative to said toes to embrace both toes when said element is in an intermediate position and only one of said toes when in either extreme position, and a shifter collar rotatably mounted on the driving member having cam engagement with one end of said energizing element for shifting it between said extreme and intermediate positions, whereby said driving member will impart rotation to said driven member through said spring in either direction when both toes are embraced by said pockets and will index said driven member through said spring in either direction according to the embraced toe of said spring 10. An indexing device including concentric driving and driven members, a pocket having an internal clutch surface mounted on the driven member for receiving and rotatably supporting therein the driving member in concentric relation thereto, a clutch spring mounted in said pocket having normal clutching engagement with the internal clutching surface thereof adapted to be wrapped down out of said clutching engagement, inwardly extending toes formed on each end portion of said spring, an energizing sleeve slidable longitudinally and rotatable with said driving member within said spring for selective positioning relative thereto, means provided on said energizing element movable therewith into and out of toe engaging position, a shifter collar rotatably mounted on the driving member having cam engagement with one end of said energizing element for shifting it between intermediate and extreme positions, tongue and groove formations on said collar and element for registering them in said intermediate and extreme positions, and a spring operably associated with said shifter element for yieldingly maintaining them in tongue and slot engagement, whereby said driving member will impart rotation to said driven member through said clutch spring in either direction when said shifter and element are in intermediate position and will index said driven member through said clutch spring in either direction when said shifter and element are in extreme positions.

11. An indexing device including a driving member, a driven member, one of said members being provided with a clutch surface, a clutch spring mounted for clutching engagement with said surface having spaced energizing portions, an energizing element slidably mounted for rotation with the other of said members movable for operative engagement with one or the other spaced portions of said spring when in extreme position and both spaced portions when in its intermediate position, and a shifter operable to position said energizing element relative to said spring for selectively indexing the driven member in a selected direction when one or the other of said portions is engaged thereby or positively driving said driven member in either direction when both of said portions are engaged thereby.

12. An indexing device including a driving member, a driven member, one of said members being provided with a clutch surface, a clutch spring mounted for clutching engagement with said surface having spaced energizing portions, an energizing element slidably mounted for rotation with the other of said members movable for operative engagement with one energizing portion of said spring when in one position and both energizing portions when in another position, a shifter operable to position said energizing element relative to said spring for selectively indexing the driven member in a selected direction when one energizing portion of said spring is engaged or positively driving said driven member in either direction when both said portions are engaged, and means operatively associated with said shifter and element to yieldingly retain them in operated position.

13. An indexing device including a driving member, a driven member, one of said members being provided with an element having a clutch surface, a clutch spring mounted for clutching engagement with said surface and provided with a projection on each end portion thereof, an energizing element rotatable with the other of said members positioned thereon for selective engagement with said projections, and a shifter operable to move one of said elements relative to the other said element to effect engagement of said energizing element with one or the other said projections to index the driven member in one or the other direction and with both said projections of said spring to move it to clutching engagement with said surface to drive said driven member in either direction.

14. An indexing device including a driving member, a driven member, one of said members being provided with an element having a clutch surface, a clutch spring carried by said clutch surface for clutching engagement therewith and provided with a projection on each end portion thereof, and an energizing element rotatable with the other of said members arranged for selective engagement with one or the other and both said projections on said spring, said elements being adjustable relative to each other to effect selective engagement between said energizing element and one or the other end portion projections of said spring for indexing the driven member in one or the other direction and with both end portions of said spring for moving it to clutching engagement with said surface to drive the driven member in either direction.

WILLIAM CARLETON STARKEY.